Sept. 9, 1969   D. LEVY ET AL   3,465,753
GAS ANALYZER-CONTROLLER EQUIPMENT
Filed Feb. 18, 1966   5 Sheets-Sheet 1

INVENTORS: DONALD LEVY
TIBOR RUSZ
STEVEN M. SZEKELY
BY Frederick W. Padden
ATTORNEY

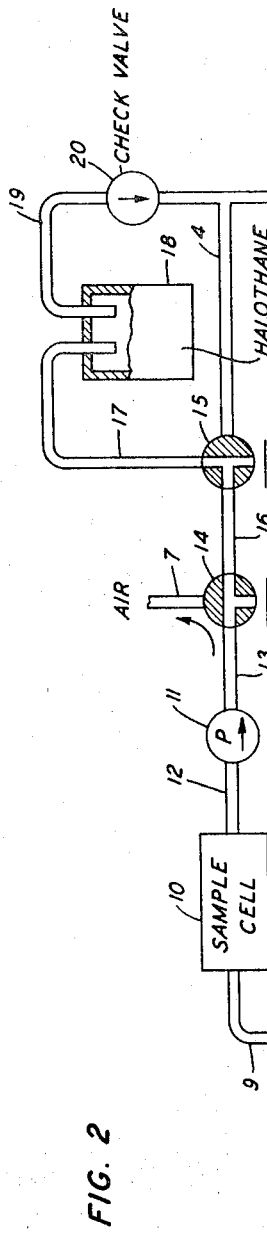

INVENTORS: DONALD LEVY
TIBOR RUSZ
STEVEN M. SZEKELY
BY
Frederick W. Padden
ATTORNEY

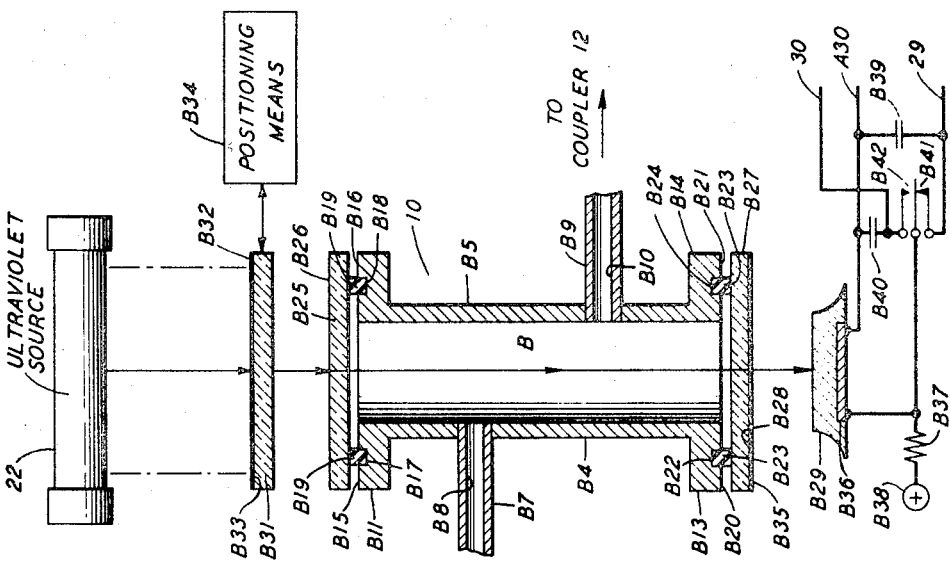
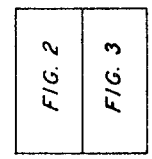
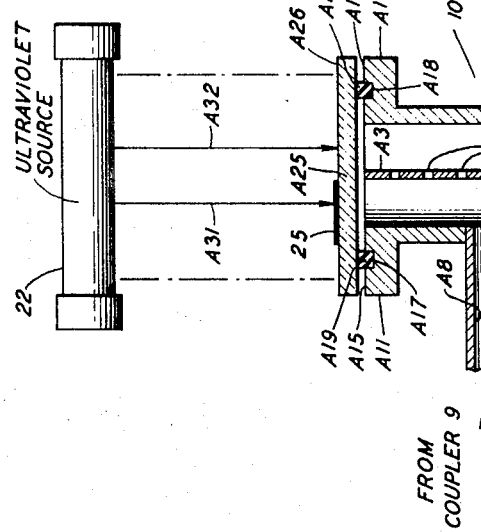

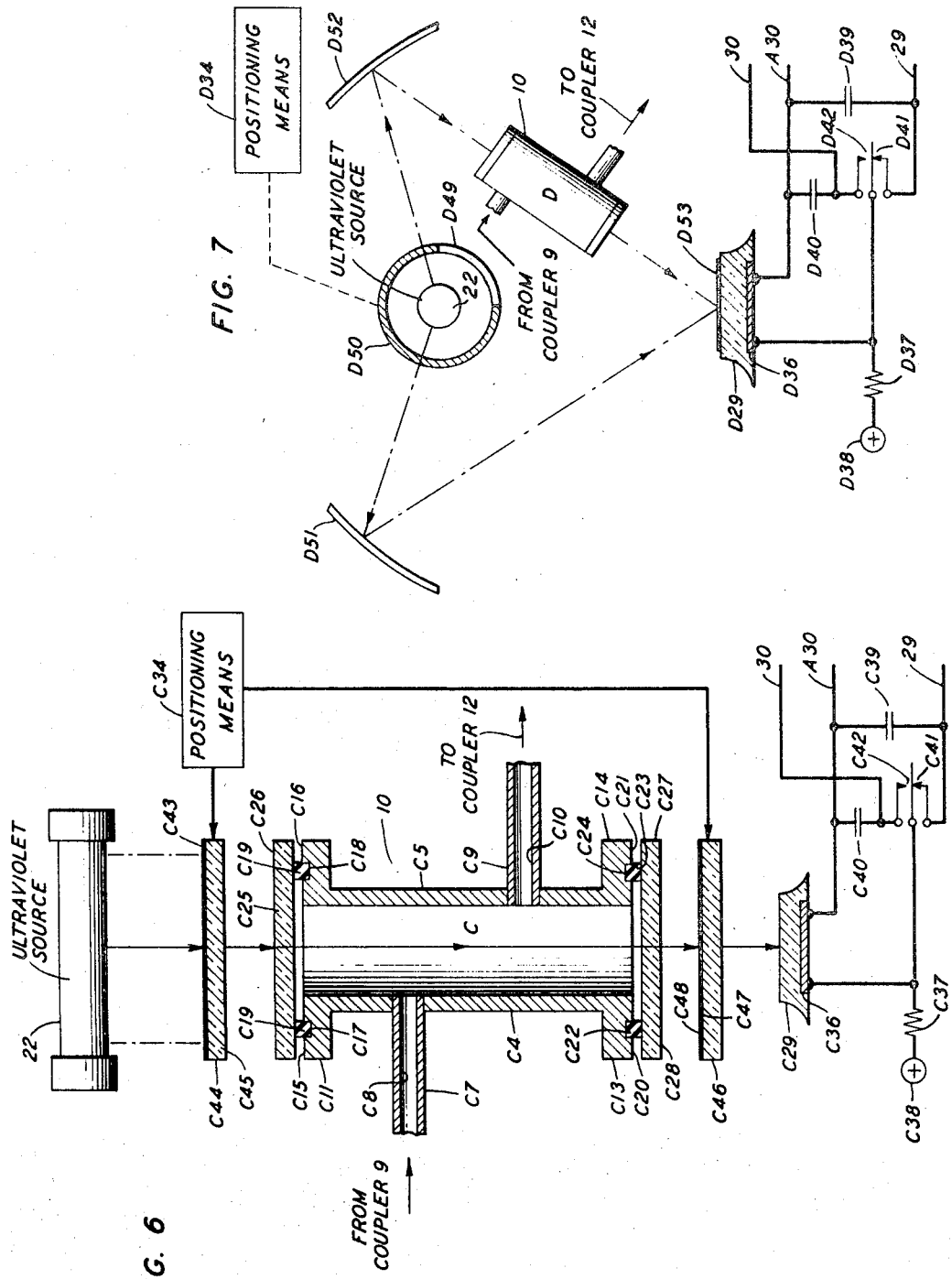

United States Patent Office 3,465,753
Patented Sept. 9, 1969

3,465,753
GAS ANALYZER-CONTROLLER EQUIPMENT
Donald Levy, Spring Valley, N.Y., Tibor Rusz, Pittsfield, Mass., and Steven M. Szekely, Union, N.J., assignors to Milab Incorporated, Elizabeth, N.J., a corporation of New Jersey
Filed Feb. 18, 1966, Ser. No. 528,655
Int. Cl. A61m *17/00*
U.S. Cl. 128—188                    29 Claims

ABSTRACT OF THE DISCLOSURE

A closed loop anesthesia system is disclosed having equipment that receives a sample of anesthesia gas administered to a patient and analyzes it to determine whether a halothane concentration therein is below or at a prescribed level. A vaporizer and controller circuitry are utilized for automatically adding halothane vapor to the exhalation path from the patient for processing through an anesthesia machine. Sample cells, ultriviolet sources, wavelength conversion devices and electrical circuits together with valves and couplers used automatically to operate and calibrate the analyzer and controller equipment to maintain a preset volume of halothane in the inhaled anesthesia.

---

This invention relates to gas analyzer-controller facilities and particularly to equipment for analyzing and controlling the concentration of anesthetic gas in anesthesia administering systems.

Present day procedures for administering anesthesia by the inhalation of volatile liquid or gaseous anesthetic drugs utilizes the well-known open or nonrebreathing, semiclosed and closed loop systems. Each of these systems administers anesthesia, such as nitrous oxide and halothane, to induce desired degrees, or planes, of subconsciousness and muscular relaxation in a user.

While the open and semiclosed loop systems of the prior art are technically reliable, they have proven inefficient and very costly due to the large volume of exhaled anesthesia which are wasted by discharges into room air. The closed loop systems heretofore available virtually eliminate anestthesia wastes by recirculating the exhaled anesthesia; however, to do so, they oftentimes employ complex and expensive analyzing apparatus and an additional specialist for monitoring and manually controlling the concentrations in the administered anesthesia.

In view of the foregoing, an object of our invention is to provide simple and economical facilities for autocatically analyzing and controlling the gas concentration in a gas supply system. Another object is to provide the foregoing facilities for automatically administering anesthesia with minimal anestthesia waste.

A further object is to provide facilities for automatically administering prescribed concentrations of anesthesia in a closed loop arrangement.

It is another object of our invention to eliminate the need for an additional specialist with the closed loop system by providing apparatus for analyzing and automatically controlling the anesthesia concentrations administered to a user.

A further object of our invention is to provide apparatus for automatically maintaining a prescribed anesthesia concentration in a closed loop system having varying degrees of anesthesia absorption.

The foregoing and other objects are attained in accordance with specific, exemplary embodiments of our invention in which efficient, simple and economical equipment is provided in a closed loop system for automatically analyzing and controlling the halothane gas concentration in the anesthesia circulating in the system whereby a patient is placed in desired planes, or states, of subconsciousness and muscular relaxation. The equipment comprises control apparatus which is settable for automatically supplying and maintaining prescribed halothane concentrations in the administered anesthesia. Accordingly, the equipment automatically replaces the halothane absorbed by the patient during the breathing process and advantageously eliminates the need for the additional specialist heretofore required in prior art systems for manually controlling the desired halothane concentration.

In accordance with an illustrative embodiment of our invention, the analyzer-controller equipment receives a sample of the anesthesia administered to the patient and analyzes it to determine whether the halothane concentration therein is below or at a prescribed level. If the concentration is below the prescribed level, the anesthesia sample is pumped through a halothane vaporizer for adding halothane vapor to the exhalation path from the patient for processing through the anethesia machine to the patient inhalation path. On the other hand, when the concentration is at the prescribed level, the halothane vaporizer is bypassed and the anesthesia sample is coupled to the patient exhalation path for recirculation through the anesthesia machine.

The equipment according to our invention comprises a sample cell and a plurality of valves and couplers for selectively circulating either air or an anesthesia sample through the cell under control of a pump. The sample cell is operatively associated with an ultraviolet energy source which is energized by a regulating amplifier for applying the ultraviolet energy at a controlled intensity to the cell for calibrating the equipment when air is circulating through the cell and for analyzing the halothane concentration when an anesthesia sample is circulated through the cell.

In one specific embodiment of our invention, a sample cell comprises an intake and an exhaust means as well as a chamber for containing the circulated air or anesthesia sample. The chamber is separated into two sections by a partition member which has a plurality of apertures for enabling air and the anesthesia sample to circulate from the intake to exhaust means. A quartz window is provided at each end of the wall for sealing the chamber. An ultraviolet to visible light material is coated on different sections of the quartz windows whereby ultraviolet energy is projected from the aforementioned source through an entrance side of one of the the chamber sections and is converted into visible light on the exit side thereof while visible light is conveyed from the entrance to the exit side of the other chamber section. This visible light conveyed through the latter section is substantially unaffected by the presence or absence of air or halothane therein. However, the ultraviolet energy passing through the first-mentioned chamber section is absorbed in proportion to the halothane concentration therein. Accordingly, during the time that air is circulating through each of the chamber sections, the intensities of the visible light emanating at the exit side of each chamber section of the sample cell are at prescribed null values. But, when halothane is present in each chamber section, the intensities of the visible light emanating at the exit sides of the first-mentioned chamber section are different from the null value.

According to one aspect of our invention, a single photocell comprises a pair of sensing elements each of which is operatively associated with an individual one of the chamber sections on its exit side for sensing the visible light intensity emanating therefrom and producing a corresponding output electrical resistance. Each of the two photocell elements is incorporated as a branch of a measurement bridge which is balanced when the sensed light intensities are at the prescribed null values and is unbalanced when the sensed intensities are different from the null values. The balanced and unbalanced states of the measurement bridge provide output potentials which are monitored by a meter. The latter comprises a low limit contact mechanism which is advantageously used to control a servo motor that balances the measurement bridge during each calibration operation. The meter also comprises an upper limit contact mechanism which is settable in accordance with the desired halothane concentration in the anesthesia and which is responsive to monitored output voltages from the measurement bridge for controlling a valve that selectively bypasses the halothane vaporizer or passes an anesthesia sample through the vaporizer for adding halothane to the patient exhalation path for processing the anesthesia machine.

Apparatus is also provided, in accordance with our invention, for automatically balancing the measurement bridge and zero setting the meter of the analyzer-controller equipment when it is initially placed in operation and at periodic intervals during the administration of anesthesia. This apparatus includes a transistor relay arrangement with a photocell which is coated with an ultraviolet to visible light conversion material and is physically positionable near the ultraviolet source for controlling the initial activation of the valves that admit air into the sample cell. The latter control operation is exercised only after the source has been initially energized to produce the desired intensity of ultraviolet energy. The apparatus also includes a cam timing arrangement which activates relay arrangements for controlling the bridge balancing and meter zero setting in the equipment at periodically recurring intervals to insure its drift-free operation during the administration of anesthesia.

The foregoing and other objects, features and advantages of our invention will be more clearly understood from a reading of the following description of the illustrative embodiments thereof with reference to the drawings in which.

Figure 3:
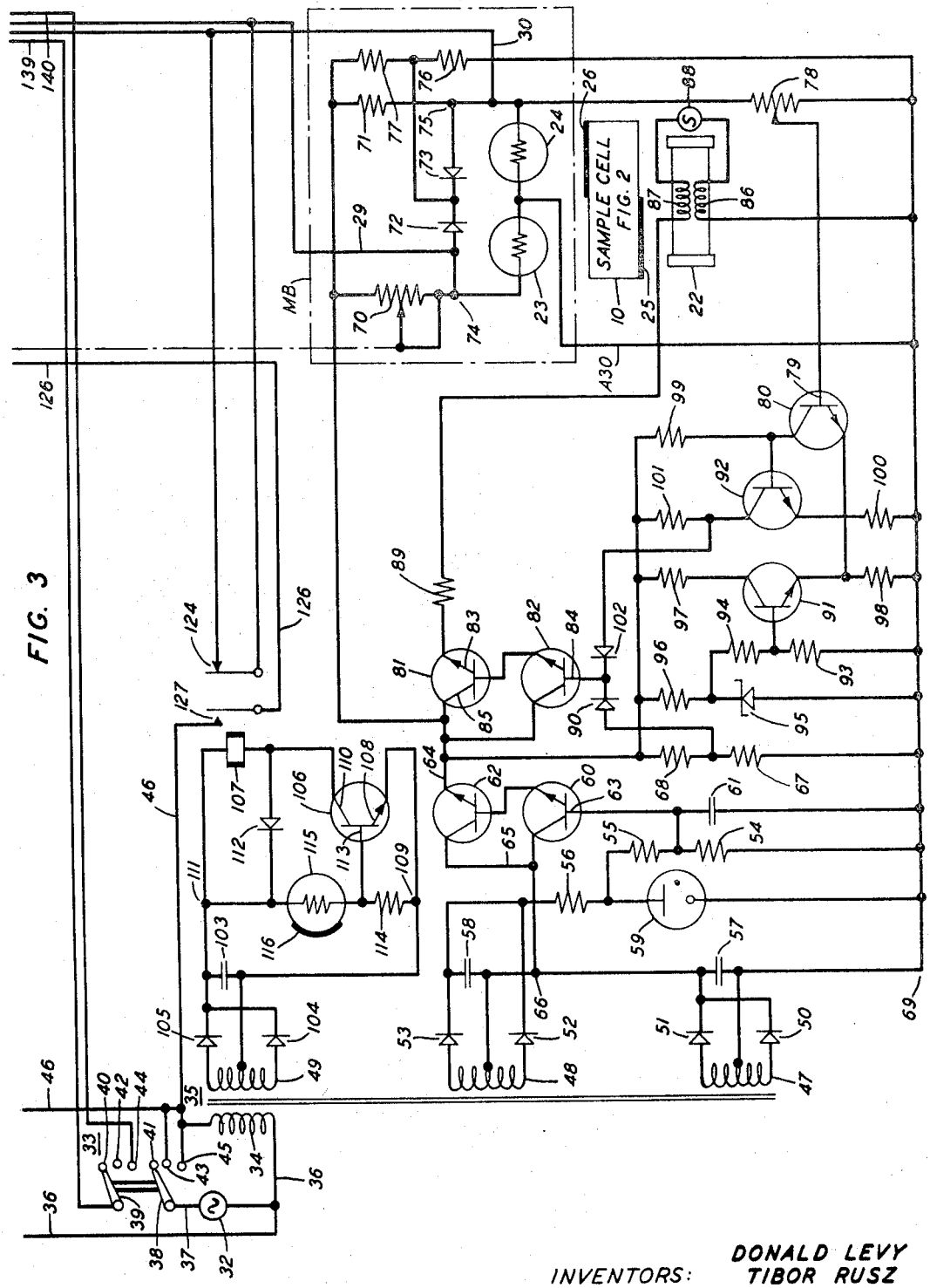

FIGS. 2 and 3 schematically depict the apparatus of a halothane analyzer-controller exemplary of our invention;

FIGS. 4 and 5 are detailed views of sample cells and ultraviolet energy sources for use in the halothane analyzer-controller of FIGS. 2 and 3;

FIGS. 6 and 7 are structural views of other sample cells and control arrangements according to our invention; and FIG. 8 shows the position in which FIGS. 2 and 3 may be placed to illustrate the circuit interconnections.

Figure 1:
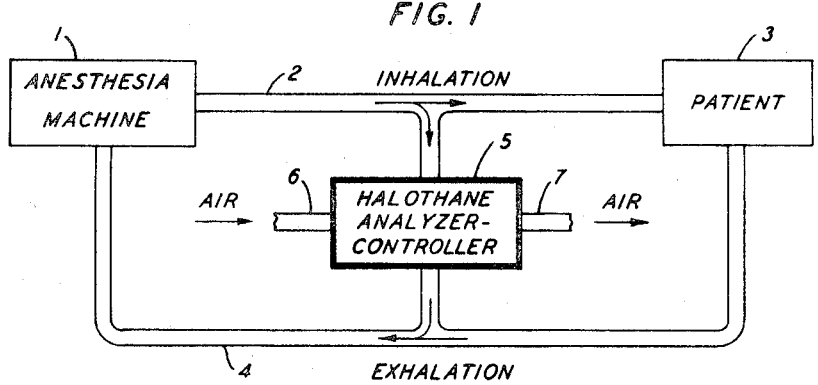
FIG. 1 is a block diagram of an anesthesia administering system utilizing halothane analyzer-controller facilities in accordance with our invention.

Referring to FIG. 1, a closed loop system is shown for administering anesthesia to a patient under control of our illustrative halothane analyzer-controller equipment. The system comprises an anesthesia machine 1 for applying anesthesia through an inhalation coupling facility 2 to a patient 3. An exhalation loop of the system is provided between the patient 3 and machine 1 by means of the exhalation coupling facility 4. According to our invention, the analyzer-controller equipment 5 is associated with the coupling facilities 2 and 4 for maintaining a prescribed concentration of halothane in the anesthesia administered to patient 3. The equipment 5 initially introduces halothane gas into the exhalation facility for processing through the machine 1 to the patient 3 via facility 2. Equipment 5 also receives a sample of the anesthesia passing through the inhalation facility 2 and analyzes that sample to determine the halothane concentration. In response to the analysis, equipment 5 is arranged for automatically supplying additional halothane to the system via the exhalation facility 4 when the concentration is below a preselected value. It also withholds the addition of halothane when the sampled concentration of halothane contains the prescribed value. An air intake device 6 is associated with the equipment 5 for periodically enabling that equipment to calibrate, or balance its measurement bridge and zero set its meter, by pumping air through its sampling apparatus and the exhaust means 7.

Figure 1A:
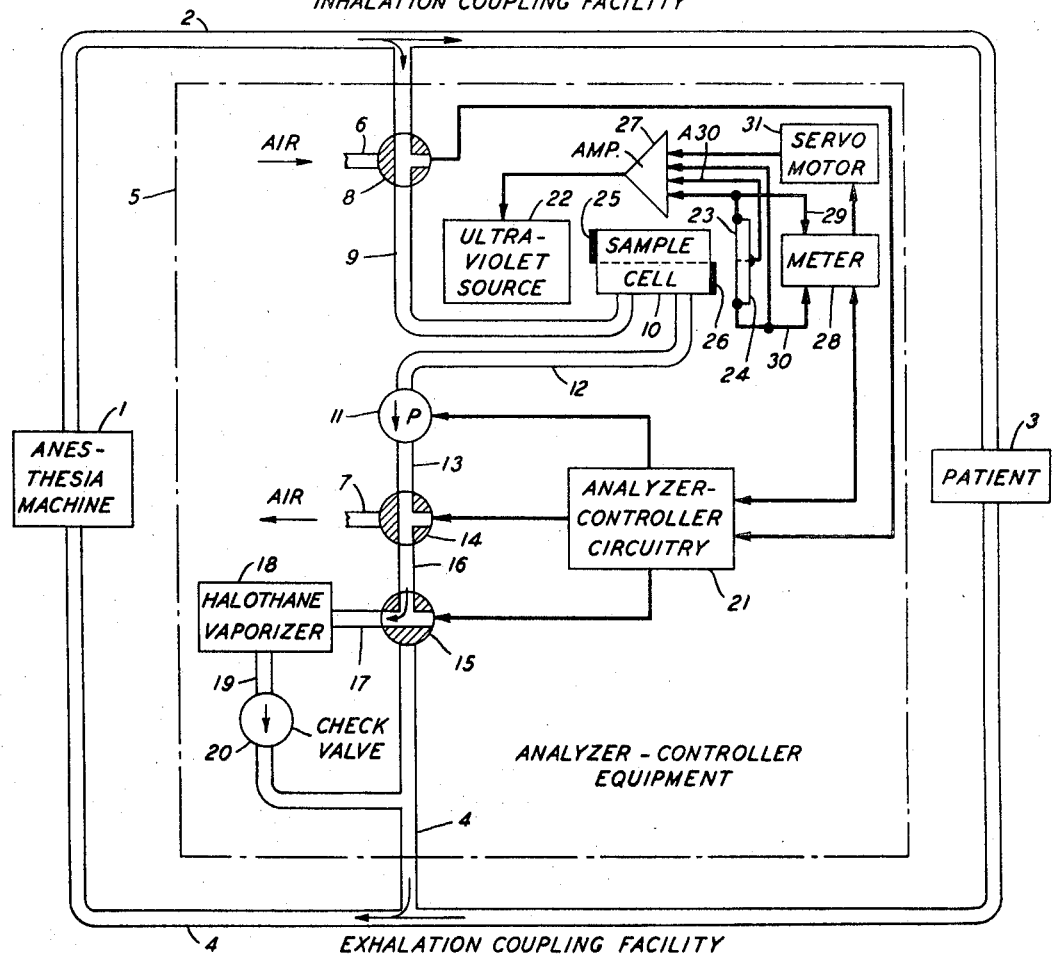
FIG. 1A shows, in block diagram form, the functional interrelation of illustrative features of a halothane analyzer-controller according to our invention.

The general organization of the principal apparatus units of the analyzer-controller equipment 5 will now be described with reference to FIG. 1A. A valve 8 is associated with the inhalation coupling facility 2 and the air intake device 6 for selectively applying either a sample of anesthesia or air via the coupler 9 to a sample cell 10. A pump 11 is connected to the cell 10 via the coupler 12 for extracting either the air or anesthesia sample from cell 10 and applying it via coupler 13 and valve 14 to either the air exhaust means 7 or to a valve 15 via a coupler 16. The valve 15 is selectively operable for passing an extracted anesthesia sample to the exhalation coupling facility 4 either directly or via coupler 17, a halothane vaporizer 18, coupler 19, and the check valve 20. The pumping action of the pump 11 enables an anesthesia sample to be passed through vaporizer 18 for introducing halothane into the exhalation facility 4 whereby it is processed through the anesthesia machine 1 to the inhalation facility 2 for administration to the patient 3. The machine 1 comprises an oxygen supply and flow meter facilities, as well as a breathing bag and carbon dioxide absorber apparatus, which may be of conventional design.

The analyzer-controller circuitry 21 controls the selective actuation of the valves 8, 14 and 15 together with the operation of the pump 11. Initially, valves 8 and 14 are actuated and pump 11 is operative for pumping air through the sample cell 10 for the calibration of the equipment 5 with respect to a zero halothane concentration in cell 10. The latter cell is operatively associated with an ultraviolet energy source 22 and the photocell elements 23 and 24 for ascertaining the halothane concentration in the closed loop system.

In accordance with a specific exemplary embodiment of our invention, the cell 10 is coated with fluorescent materials 25 and 26 at opposite end segments of the cell 10. The ultraviolet energy produced by source 22 impinges on material 25, and, in response thereto, material 25 emits visible light and absorbs incident ultraviolet energy. The emitted light passes through the cell 10 and is sensed by the photocell element 23 which, in turn, operates the translating amplifier 27 for controlling the degree of energization of source 22. Similarly, an amount of the ultraviolet energy from source 22 is projected through an uncoated segment of cell 10 and impinges on the material 26 which then emits visible light for detection by photocell element 24.

Photocell elements 23 and 24 are part of a balanced electrical measurement bridge which also comprises apparatus in the amplifier 27. When a zero halothane concentration is present in the sample cell 10, the measurement bridge is to be balanced and the electrical potential applied to the meter 28 via the leads 29 and 30 is to be zero. If a potential other than zero is applied to meter 28, it indicates that the measurement bridge is unbalanced. Accordingly, the meter 28 cooperates with the circuitry 21 to control the servo motor 31 for automatically balancing the bridge whereby the potential between leads 29 and 30 is zero and the bridge and meter 28 of equipment 5 are calibrated for zero set.

After the calibration has been completed, the circuitry 21 actuates the valves 8 and 14 for pumping an anesthesia sample from the inhalation facility 2 through the path including the sample cell 10, pump 11, valve 15, vaporizer 18 and check valve 20 to the exhalation facility 4. As a result, a concentration of halothane is introduced into the exhalation facility 4 and it is processed through the anesthesia machine 1 and the inhalation facility 2 for application to the patient 3.

Ultraviolet source 22, sample cell 10 and the photocell elements 23 and 24 cooperate to analyze the halothane concentration in the anesthesia circulating in the closed loop. The ultraviolet energy from source 22 impinges on material 25 for emitting visible light which passes through the halothane sample in cell 10 unaffected by the presence or absence of halothane therein and is detected by the photocell element 23. Ultraviolet energy from source 22 is also projected through an uncoated segment of cell 10 and an amount thereof is absorbed by the halothane sample in cell 10. The unabsorbed ultraviolet energy impinges on the fluorescent material 26 for emitting visible light which is detected by photocell element 24. The intensity of the ultraviolet energy impinging on material 26 and the visible light emitted by material 26 is related to the concentration of the halothane sample being pumped through cell 10. Thus, when halothane is present in cell 10, the measurement bridge is unbalanced by a photoelectric action of cell elements 23 and 24 and the potential between leads 29 and 30 is other than zero.

Meter 28 measures the potentials between leads 29 and 30 to insure that the halothane concentration in the closed loop remains at a prescribed value. When the concentration reaches the prescribed value as a result of pumping an anesthesia sample through the vaporizer 18, the meter 28 and circuitry 21 automatically cooperate to actuate valve 15 for interrupting the circulation of the anesthesia samples through the vaporizer 18 and for pumping the samples from coupler 16 directly to the exhalation facility 4.

The foregoing analysis of the halothane concentration continues while the anesthesia sample bypasses the vaporizer 18 via valve 15. After the patient 3 absorbs an amount of the halothane in the closed loop system during the breathing process, the analysis by equipment 5 indicates that the concentration is below the prescribed value. As a consequence, meter 28 and circuitry 21 automatically cooperate to actuate valve 15 for passing the anesthesia sample through the vaporizer 18 for again supplying halothane to the system via the exhalation facility 4.

At periodically recurring intervals after halothane has been introduced into the system, the equipment 5 automatically checks its measurement bridge balance and meter zero set calibration. This operation is initiated when the controller circuitry 21 actuates the valves 8 and 14 for interrupting the flow of an anesthesia sample through the cell 10 and closing the path for admitting air through the intake device 6 to the cell 10. The electrical measurement bridge including the photocell elements 23 and 24 is then balanced where necessary under control of meter 28 and servo motor 31 in a manner as explained previously. At the end of a calibration interval, the circuitry 21 automatically actuates valves 8 and 14 to interrupt the air flow through the intake and exhaust devices 6 and 7 and to resume the circulation of the anesthesia sample through cell 10 and the halothane vaporizer 18 as already described.

Turning now to FIGS. 2 and 3, a detailed description is presented of the analyzer-controller equipment 5. The anesthesia machine 1 and patient 3 are shown in FIG. 2 associated with the inhalation and exhalation facilities 2 and 4. An anesthesia sample is selectively admittable from inhalation facility 2 through valve 8, coupler 9, sample cell 10 and coupler 12 to be pumped through pump 11, coupler 13, valve 14, coupler 16 and valve 15 directly to the exhalation facility 4 or via the halothane vaporizer 18 for applying halothane to the system via coupler 19 and check valve 20. The valves 8 and 14 are also selectively operable for circulating air from the intake device 6 through coupler 9, cell 10, coupler 12, pump 11 and coupler 13 to the exhaust means 7 for the balancing of the measurement bridge MB and zero setting of the meter 28.

The power for operating the analyzer-controller equipment is supplied by the AC (alternating current) source 32 which is connected to a function selector switch 33 and the primary winding 34 of the power transformer 35 via leads 36 and 37. Switch 33 comprises a pair of wipers 38 and 39 as well as two banks of three terminals, each of which is individually connectable to one of the wipers 38 or 39. The latter wipers are shown connected to terminals 40 and 41 in FIG. 3 to define the off state of the equipment 5. A monitor state of the equipment 5 is established when wipers 38 and 39 are in contact with terminals 42 and 43, respectively. When wipers 38 and 39 contact terminals 44 and 45, equipment 5 is in its control state for analyzing and controlling the concentration of halothane in the system. The monitor and control states of the equipment 5 are identical except that the winding 15a of valve 15 in FIG. 2 is not energizable in the monitor state for introducing halothane into the system.

In the control state, AC power is supplied from source 32 for energizing the pump 11 of FIG. 2 over the path including lead 36, the pump energizing winding 11a, lead 46, terminal 45 and wiper 38. AC power is also applied to the primary winding 34 of transformer 35 via lead 36, source 32, lead 37, wiper 38 and terminal 45. As a result, AC is coupled by transformer action to each of the secondary windings 47, 48 and 49 of transformer 35. The diodes 50, 51, 52 and 53 together with the resistors 54, 55 and 56 form part of a full-wave rectifier for converting the AC induced in the center-tapped windings 47 and 48 into DC (direct current) for operating the associated transistor amplifiers. Capacitors 57 and 58 are used across the resistors 54, 55 and 56 for filtering the rectified AC. Gas tube 59 is bridged across resistors 54 and 55 and in series with resistor 56 for regulating the DC voltage supplied to the base electrode of transistor 60. Capacitor 61 shunts resistor 54 for filter action.

Transistors 60 and 62 are arranged in a well-known Darlington configuration for stabilizing the combined gain of the transistors independently of ambient temperature changes and variations in the gain of the individual transistors. The transistors 60 and 62 may be referred to as having effectively a single base electrode 63, emitter electrode 64 and collector electrode 65. The collector 65 is connected to a positive DC voltage supplied at point 66 by the full-wave rectifier. Emitter 64 is connected to the voltage divider resistors 67 and 68 for forward biasing the emitter 64 and base 63 junctions and enabling transistors 60 and 62 to function as an emitter follower.

A balanced measurement bridge MB is connected between the negative DC voltage supplied at point 69 and the emitter electrode 64. The bridge comprises one leg having the photocell element 23 and rheostat 70 and a second leg comprising the photocell element 24 and resistor 71. A pair of oppositely-poled diodes 72 and 73 are connected between points 74 and 75 of the bridge and are biased by voltage divider resistors 76 and 77. The photocell elements 23 and 24 each present a specific resistance in the bridge in response to the detection of visible light projected from the sample cell 10. Rheostat 70 is automatically adjustable under the control of the servo motor 31, as later described, for balancing the bridge so that the potential difference between points 74 and 75 is zero during a calibration operation. A potentiometer 78 is connected in parallel with photocell element 24 and in series with resistor 71 for obtaining a preset bias for the base electrode 79 of transistor 80.

Transistors 81 and 82 are also connected in a Darlington configuration with an effective emitter electrode 83, base electrode 84 and collector electrode 85. The latter electrode is connected to the emitter 64. The emitter 83 to base 84 junctions are forward biased by a current flowing from point 69 through the energizing windings 86 and 87 of the ultraviolet source 22, a conventional starter device 88, resistor 89, emitter 83, base 84, diode 90 to a positive DC voltage supplied at the junction of resistors 67 and 68. As a result, transistors 81 and 82 function as an emitter follower and energize the source 22 for projecting ultraviolet energy toward the sample cell 10.

The transistors 80, 91 and 92 comprise part of a regulating amplifier for automatically adjusting the bias for the base 84 to emitter 83 junctions whenever DC voltage changes occur as a result of variations in power source 32 or in the resistance of photocell element 24. A base bias for transistor 91 is obtained from voltage divider resistors 93 and 94 which are bridged across a Zener diode 95. The latter diode is serially connected with resistor 96 for operation in its Zener region to supply a fixed voltage to resistors 93 and 94. Consequently, the emitter-base junction of transistor 91 is forward biased for developing a voltage drop across a collector resistor 97 and an emitter resistor 98 whereby the emitter-base junction of transistor 80 is forward biased. The conduction of transistor 80 causes collector current flow through resistor 99 and base current flow through transistor 92 and resistor 100, as well as collector current flow through resistor 101. The latter current flow controls the bias for base 84 via diode 102 and enables the transistors 81 and 82 to regulate automatically the energized state of the ultraviolet source 22 over a range of power supply variations whereby the measurement bridge remains balanced in the presence of such variations. Moreover, the regulating amplifier enables the resistance of the photocell element 24 to remain at the null, or zero set, value by increasing or decreasing the energization of source 22 and, accordingly, the intensity of the output ultraviolet energy.

The secondary winding 49 of the power transformer 35 is part of a full-wave rectifier comprising capacitor 103 and the diodes 104 and 105 which converts the input AC power to a DC voltage for operating the NPN transistor 106 and the associated relay 107. The emitter 108 of transistor 106 is connected to the negative DC potential at point 109 and the collector 110 of transistor 106 is connected via the energizing winding of relay 107 to the positive DC potential at point 111. A diode 112 is bridged across relay 107 for protecting the transistor 106 against surges which occur when relay 107 is released. The base 113 of transistor 106 is connected to the midpoint of a voltage divider including resistor 114 and photocell 115 which are bridged across capacitor 103. Photocell 115 is coated with an ultraviolet to visible light conversion compound 116 and is physically located in equipment 5 for receiving ultraviolet energy from the source 22. The cell 115 provides a high electrical resistance in the absence of a prescribed ultraviolet energy from source 22, such as when the source 22 is deenergized and the equipment 5 is in its off state. The high resistance biases transistor 106 so that relay 107 is unoperated. On the other hand, when the equipment 5 is switched to its monitor or control state and source 22 is energized, as previously described, a prescribed ultraviolet energy is projected from that source to the photocell 115 and its resistance is lowered sufficiently to forward bias transistor 106 whereby sufficient collector current flows to operate relay 107.

Before considering the circuit actions which occur after relay 107 is operated, it is advisable to explain that the meter 28 of FIG. 2 is operative under control of the AC power supplied to leads 36 and 46. Meter 28 may be of a conventional design and therefore only those features thereof utilized in accordance with our invention are described. A low limit mechanism 117 and a high limit mechanism 118 are associated with an indicator 119 of the meter 28. Mechanism 117 cooperates with indicator 119 to control the make and break contacts 120 and 121 of meter 28 whenever the indicator 119 is deflected to coincide with mechanism 117 on the meter scale 122.

Similarly, mechanism 118 cooperates with indicator 119 to control break contact 123 of meter 28 whenever indicator 119 is deflected to coincide with mechanism 118 on scale 122. Mechanisms 117 and 118 are settable at prescribed points on scale 122 and, in the exemplary embodiment, mechanism 117 is set at the zero point of scale 122 and mechanism 118 is set at approximately midscale. Contacts 120 and 121 are used to energize servo motor 31 for automatically setting rheostat 70 to balance the measurement bridge during a calibration operation as hereinafter explained. Contact 123 controls the valve 15 to interrupt the circulation of an anesthesia sample through the halothane vaporizer 18 when the analyzed halothane concentration is at a prescribed value corresponding to the middle of scale 122. The control circuitry (not shown) of meter 28 is connected across the photocell elements 23 and 24 of the measurement bridge via leads 29 and 30 and the voltage present thereon is indicated on scale 122 by indicator 119.

Considering now the operation of the equipment 5 from the point at which relay 107 is operated, as previously described, it is noted that relay 107 opens its break contact 124 for removing the short across the leads 29 and 30 which is used for meter damping during the off state of equipment 5. The operation of relay 107 also closes the circuit for operating the thermal time delay relay 125 of FIG. 2. This circuit is from the AC on lead 36 through the winding of relay 125, lead 126 and contact 127 to the AC on lead 46. Relay 125 is a slow acting device which enables the analyzer-controller to be processed through a bridge MB and meter 28 calibration cycle before it operates.

Relay 128 is connected in parallel with the winding of relay 125 via its contact 129 and relay 128 immediately operates when contact 127 of relay 107 is closed. In operating, relay 128 closes contact 130 to complete the circuit paths for energizing the neon calibration light 131, the valves 8 and 14, and the servo motor 31. Light 131 indicates that the analyzer-controller is in its calibration cycle and is energized in the path from the AC on lead 36 through the lamp, contact 130, lead 126, and contact 127 to the AC on lead 46. Valves 8 and 14 are energized for admitting air through the intake means 6 and circulating it through coupler 9, sample cell 10, coupler 12 under control of the previously energized pump 11 and then through coupler 13 to the air exhaust means 7 whereby a zero halothane concentration is present in cell 10. The valves are energized over the path from the AC on lead 36 through the energized windings 8a and 14a of valves 8 and 14 in parallel, lead 132, contact 130, lead 126, and contact 127 to the AC on lead 46. The servo motor 31 is energized via its winding 133 and the low limit contacts 120 and 121 to the AC on lead 36 and from the center tap of winding 133 through contact 130, lead 126, and contact 127 to the AC on lead 46. Upon energization, servo motor 31 adjusts rheostat 70 of the measurement bridge so that a zero voltage difference is established across photocell elements 23 and 24 and between leads 29 and 30. It may be recalled that in the halothane free state, the ultraviolet energy from source 22 is converted to visible light by the fluorescent materials 25 and 26 of sample cell 10 and is projected upon the cell elements 23 and 24 to establish their null, or zero set, resistances for a zero halothane reference.

The aforementioned operation of relay 107 also actuates the motor 134 for rotating the cam 135 which automatically controls the timing between successive calibration cycles. Motor 134 is actuated in the path from the AC on lead 36, the motor winding, lead 126, and contact 127 to the AC on lead 46.

The balancing of the measurement bridge and the energization of the ultraviolet source 22 are completed in the time delay interval allowed for the operation of the thermal relay 125. In operating, relay 125 opens its contact 129 to effect the deactivation of relay 128 which, in turn, opens its contact 130 to deenergize lamp 131, servo motor 31 and valves 8 and 14. The deactivation of valves 8 and 14 interrupts the air flow through intake and exhaust devices 6 and 7. It also enables an anesthesia sample from machine 1 to be passed through sample cell 10 and pump 11 to valve 15.

Deactivated relay 128 energizes the neon lamps 136 and 137 and the valve 15. Lamp 136 indicates that a halothane concentration reading is being made and it is energized by applying the AC power on lead 126 via the 128 relay contact 138 and lamp 136 to the AC power on lead 36. Valve 15 is energized for circulating the anesthesia sample through vaporizer 18 to supply halothane to the exhalation facility 4 for processing through machine 1 to the patient 3. The valve 15 is energized in the path from the AC on lead 126 through contacts 138 and 123, lead 139, wiper 39, terminal 44, lead 140, the pump energizing winding 11a to the AC on lead 36. Lamp 137 is connected in parallel with the energizing winding 15a and thus is concurrently energized with that winding for indicating that halothane is being added to the closed loop system.

As halothane is thus added to the system, the electrical resistance of photocell element 23 remains fixed but that of photocell element 24 changes due to the absorption of the ultraviolet energy from source 22 by the halothane in sample cell 10 and accordingly the resultant lowering of the visible light emitted by material 26 for detection by cell element 24. The resistance change of cell element 24 unbalances the measurement bridge and alters the voltage difference across cell elements 23 and 24 and between leads 29 and 30. Meter 28 measures this voltage and indicates its magnitude by indicator 119. When indicator 119 is below the high limit mechanism 118, valve 15 remains energized for introducing halothane into the system. However, when the indicator 119 coincides with the mechanism 118, the analyzed halothane concentration is at the prescribed value and mechanism 118 actuates contacts 123 for deenergizing valve 15 and lamp 137. As a result, halothane is not added to the system and the anesthesia sample bypasses vaporizer 18 directly from valve 15 to the exhalation facility 4.

When the halothane concentration in the anesthesia sample decreases, a lower voltage difference is indicated by indicator 119 and therefore mechanism 118 recloses the high limit contact 123 for energizing lamp 137 and valve 15 over the described path. Thus, the anesthesia sample is again circulated through the vaporizer for supplying halothane to the exhalation facility 4 for processing through machine 1 to patient 3. The foregoing circuit action results in an equilibrium between the halothane removed by the patient and added to the system at the desired concentration as set by the high limit mechanism 118 of meter 28.

In accordance with our invention, the analyzer-controller measurement bridge MB and meter 28 are automatically checked and calibrated for balance and zero setting, respectively, at periodic intervals during the administration of anesthesia to the patient 3. This insures that the analyzer-controller accuracy is substantially drift-free. The periodic check and calibration is made automatically under control of the continuously operative motor 134 which, as previously described, is operated under control of relay 107 for rotating cam 135. The latter cam contains a slotted member 141 in the cam surface 142. A cam follower 143 is associated with cam surface 142 and at periodic recurring intervals is inserted in slot 141 for actuating contact 144 to initiate the check and calibration operation. The actuation of contact 144 operates relay 128 over the path from the AC on lead 126, contact 144, and the energizing winding of relay 128 to the AC on lead 36. In operating, relay 128 opens contact 138 to deenergize valve 15 and the lamps 136 and 137. The operation of relay 128 also energizes the calibrate lamp 131 and winding 133 and actuates valves 8 and 14, as previously explained. The actuation of valves 8 and 14 circulates air from intake device 6 through sample cell 10 to exhaust means 7 and, accordingly, enables the measurement bridge and meter 28 to cooperate for controling the servo motor 31 for setting rheostat 70 to balance the bridge whereby the voltage difference across leads 29 and 30 is zero.

Cam follower 143 remains in slot member 141 for a prescribed interval for enabling the calibration balance of bridge MB. At the end of the latter interval, follower 143 is extracted from slot 141 and, in turn, deactivates lamp 131 and the valves 8 and 14. The deactivation of these valves again enables an anesthesia sample to be admitted from inhalation facility 2 through sample cell 10, pump 11 and valve 15 to the exhalation facility 4.

The release of relay 128 also recloses at its contact 138 the previously traced circuits for lighting the read and halothane lamps 136 and 137 and for energizing valve 15. The latter valve then circulates the anesthesia sample through vaporizer 18 for again supplying halothane to the exhalation facility 4 for processing through machine 1 and the inhalation facility 2 to patient 3.

FIGS. 4 and 5 show detailed views of the structural elements of the exemplary embodiments of the sample cell 10 for the halothane analyzer-controller equipment of our invention. In FIG. 4, sample cell 10 comprises a body which may be of cylindrical shape defining a hollow inner chamber partitioned into two sections A1 and A2 by a vertically extending member A3 and bounded by wall elements A4 and A5. The partition member A3 contains a plurality of apertures A6 for admitting air and anesthesia samples between the chamber sections A1 and A2. Element A4 includes an intake member A7 having an inner bore A8 for passing the air or anesthesia sample from the associated coupler 9 of FIG. 2 to the chamber section A1. The wall element A5 comprises an exhaust member A9 having an inner bore A10 for conveying the air or anesthesia sample from chamber section A2 to the coupler 12 of FIG. 2.

Elements A4 and A5 further comprise upper shoulders A11 and A12 as well as lower shoulders A13 and A14, respectively. The upper shoulders A11 and A12 comprise surfaces A15 and A16 each of which includes cavity members A17 and A18, respectively, for receiving a mating and complementing seal spacer A19. Similarly, the lower shoulders A13 and A14 comprise surfaces A20 and A21 each of which includes cavity members A22 and A24, respectively, for receiving the mating and complementing seal spacer A23.

A window A25 is contiguously affixed to the spacer A19 above surfaces A15 and A16. Window A25 is coated with a fluorescent material 25 in the exemplary embodiment on a segment of its surface A26 which is over chamber section A1 and extends outwardly from upper surfaces A15 and A16. In like fashion, a window A27 is contiguously affixed to the spacer A24 below the surfaces A20 and A21. Window A27 is coated with a fluorescent material 26 in the exemplary embodiment on a segment of its surface A28 which is associated with chamber section A2 and extends outwardly from the lower surfaces A20 and A21. Windows A25 and A27 may suitably comprise a quartz material capable of passing ultraviolet energy in a 2537 Angstroms range and visible light.

A unitary structure of photocell elements 23 and 24 is housed in a glass member A29 and is respectively aligned with an individual one of the chamber sections A1 or A2 under the window A27. Cell elements 23 and 24 are connected over a common lead A30 to point 69 in FIG. 3 and to leads 29 and 30, respectively, of the measurement bridge MB of FIG. 3. A unitary structure or body of elements 23 and 24 is advantageously utilized in order to secure desirable characteristics. The unitary body of elements 23 and 24 reduces drift due to temperature, aging and incident radiation. Moreover, it insures that each half of the body drifts in the same direction because both halves have the same manufacturing history, impurities, operate at the same temperature, have the same age and the like characteristics. The use of two separate photocells for the elements 23 and 24 would subject them to error resulting from non-uniform drift characteristics.

Ultraviolet source 22 is positioned in alignment with the chamber sections A1 and A2 and when energized as previously described, projects ultraviolet rays A31 and A32 toward those sections. The ray A31 impinges on the fluorescent material 25 which converts it to visible light for passage through chamber section A1, window A27, and glass member A29 to photocell element 23 whereby a prescribed electrical resistance is produced between leads 29 and A30 for the measurement bridge MB of FIG. 3. The ultraviolet ray A32 extends from a source 22 through window A25, chamber section A2, and the window A27 for impinging on material 26 which converts it into visible light that extends through glass member A29 to element 24. In response to such light, a prescribed electrical resistance is produced by element 24 between leads 30 and A30 for measurement bridge MB of FIG. 3.

The fluorescent materials 25 and 26 of FIG. 4 may comprise, by way of example, zinc silicate which has a sensitivity peak at 2537 Angstroms wavelength, high conversion efficiency from 2537 Angstroms to visible light, and a visible light emitted peak at 5250 Angstroms wavelength. Cell elements 23 and 24 of FIG. 4 may comprise cadmium sulphide having a peak sensitivity at approximately 5250 Angstroms. Ultraviolet source 22 advantageously has a high intensity output at 2537 Angstroms wavelength.

Accordingly, air of an anesthesia sample may be selectively coupled from coupler 9 through bore A8 for admission to chamber section A1 and via apertures A6 to chamber section A2 for exhaust through bore A10 to coupler 12. When air is present in chamber sections A1 and A2, the electrical resistances of photocell elements 23 and 24 are such as will enable the balancing of the measurement bridge MB and production of a zero indication on meter 28, but the resistance of element 24 is altered in accordance with the halothane concentration in chamber section A2. The latter action occurs because the visible light emitted from material 25 passes through chamber section A1 unaffected by the halothane, but the ultraviolet energy passing through chamber section A2 is absorbed in proportion to the halothane concentration therein. Accordingly, the amount of ultraviolet energy impinging on the fluorescent material 26 is reduced and the resistance of cell element 24 is altered for unbalancing the measurement bridge MB for the analysis and control actions hereinbefore described with respect to FIGS. 2 and 3 for supplying halothane to the closed loop system.

Referring to FIGS. 5, 6 and 7, other exemplary embodiments of sample cells and associated apparatus in accordance with our invention are disclosed. Each of the FIGS. 5, 6 and 7 discloses essentially the same sample cell structure as that depicted in FIG. 4. Accordingly, the elements of FIGS. 5, 6 and 7 are designated with the same number and a prefix B, C and D, respectively, instead of the prefix A of FIG. 4. Cell 10 of FIGS. 5, 6 and 7 differs from that of FIG. 4 in that it eliminates the partition member A3 of FIG. 4 in the chamber B, C and D. In FIG. 5, the window B25 is not coated with a fluorescent material as is window A25 of FIG. 4, but a fluorescent material B35 is coated on the entire surface B28 of window B27. Material B35 advantageously may comprise, by way of example, calcium phosphate or cadmium borate having a high sensitivity to both the 3661 Angstroms wavelength emitted from the conversion material B32 and the emitted 2537 Angstroms ultraviolet energy emitted from source 22. In FIG. 6, neither window C25 nor window C27 of cell 10 is coated with a fluorescent material. Cell 10 in FIG. 7 is essentially identical in structure to that disclosed in FIG. 6. An ultraviolet source 22 is employed in FIGS. 5 and 6 in substantially the same positioning arrangement as for the cell 10 of FIG. 4 and also supplies an ultraviolet energy under control of the transistor circuitry of FIG. 3, with a high intensity at 2537 Angstroms wavelength.

FIG. 5 discloses a filter B31 having a conversion material B32 coated on its surface B33 and filter B31 is interposable between source 22 and the window B25 under control of the positioning means B34. Material B32 converts ultraviolet energy at the 2537 Angstroms wavelength to energy at 3661 Angstroms wavelength and may comprise, by way of example, barium silicate or magnesium silicate each of which has an emitted peak intensity in the ultraviolet range. The filter B31 enables only the energy at approximately 3661 Angstroms wavelength to pass through through the window B25 into chamber B for impinging on the fluorescent material B35 via the window B27 for conversion to visible light.

In FIG. 5, a single photocell element B36 is housed in a glass member B29. Element B36 is serially connected from the negative DC voltage on lead A30 of FIG. 3 through resistor B37 to the positive DC voltage B38 which, for example, is available at the emitter electrode 64 of FIG. 3. A capacitor B39 is connected between leads A30 and 29 while another capacitor B40 is connected between leads A30 and 30. These capacitors are incorporated in the measurement bridge MB of FIG. 3 in place of the photocell elements 23 and 24 of FIG. 3. Capacitors B39 and B40 are selectively charged under control of the recurrently actuated switch contacts B41 and B42. To illustrate, capacitor B39 is charged from the negative DC on lead A30 via contact B41 and resistor B37 toward the positive DC B38 and capacitor B40 charges from the negative DC on lead A30 via contact B41 and resistor B37 toward the positive DC B38. The magnitude of the charge on capacitor B39 or B40 is dependent upon the electrical resistance of photocell element B36 which, in turn, is dependent upon the visible light emanating from material B35 at the time its respective charging path is closed.

The contacts 41 and 42 are alternately actuated at periodically recurring intervals during the time that air is circulating through chamber for balancing the measurement bridge MB of FIG. 3 and capacitors B39 and B40, accordingly, assume voltages corresponding to the null value whereby a zero setting of meter 28 of FIG. 2 occurs. During the time that halothane is circulated through chamber B to determine its concentration, the contacts B41 and B42 are also alternately actuated and capacitor B39 maintains the null voltage value while capacitor 40 assumes a higher voltage that the null value because less visible light emanates from material B35 and impinges on photocell element B36. Capacitor B39 maintains the null voltage because the transistor amplifier of FIG. 3 automatically regulates the energized state of source 22 to do so, as previously described. Individual buffer amplifiers (not shown) may be inserted between the lead 29 and capacitor B39 as well as between lead 30 and capacitor B40 for circuit isolation.

Positioning means B34 is operative for periodically opening contact B42 and closing contact B41 to complete the charging path for capacitor B39 while concurrently interposing the coated filter B31 between the source 22 and window B25. Moreover, positioning means B34 periodically extracts the coated filter B31 from the interposed location between source 22 and window B25 and concurrently opens contact B41 and closes contact B42 to complete the charging path for capacitor B40.

When the coated filter B31 is interposed between source 22 and window B25, ultraviolet energy at 2537 Angstroms wavelength is converted by material B32 into energy at approximately 3661 Angstroms wavelength. The latter energy passes through window B25, chamber B and window B27 for impinging on the fluorescent material B35 which converts it to visible light for passage through glass member B29 onto element B36 whereby a prescribed electrical resistance is established by element B36. The resistance thus established enables the capacitor B39 to be at the aforementioned null value inasmuch as 3661 Angstroms wavelength is unaffected in its passage through chamber B by the presence or absence of halothane therein.

On the other hand, when the coated filter B31 is removed from its position between source 22 and window B25, the 2537 Angstroms wavelength energy from source 22 passes through the window B25, chamber B, window B27 and impinges on material B35 which converts that energy to visible lightf or passage through glass member B29 onto cell element B36. Accordingly, element B36 produces a resistance corresponding to the concentration of halothane present in chamber B beacuse the halothane absorbs energy in the 2537 Angstroms wavelength. The resistance thus established by element B36 enables the capacitor B40 to assume the null value when air is present in chamber B and to vary therefrom when halothane is present therein. Consequently, the voltage difference between leads 29 and 30 is monitored by meter 28 of FIG. 3 whereby halothane is supplied or withheld from the closed loop system as explained previously.

Referring to FIG. 6, it is noted that the sample cell 10 and the associated apparatus thereof are the same as that of FIG. 5, except that an ultraviolet to visible light conversion material C43 is coated on the surface C44 of a window C45, that the coated filter B31 and material B35 are not used in FIG. 6, and that an additional window C46 is coated on its surface C47 with an ultraviolet to visible light conversion material C48. By way of illustration, materials C43 and C48 may comprise zinc silicate and windows C45 and C46 may comprise quartz. Positioning means C34 is operative for recurrently interposing the coated window C45 between the source 22 and the window C25 while concurrently the coated window C46 is extracted from an interposed location between window C27 and glass member C29. As a result, ultraviolet energy from source 22 impinges on material C43 which converts it to visible light for passage through windows C45 and C25, chamber C, window C27 and glass member C29 for impinging on photocell element C36. The visible light passes through chamber C unaffected by the presence or absence of halothane therein and establishes a prescribed resistance for element C36 in accordance with the light intensity. The resistance thus established by element C36 enables capacitor C39 to assume the aforementioned null value because contact C41 is closed by means C34 concurrently with the interposing of the coated window C45.

Similarly, the positioning means C34 periodically extracts the coated window C45 from the interposed location between source 22 and window C25 and interposes the coated window C46 between the window C27 and member C29. Contact C41 is opened each time the coated window C45 is extracted from the described interposed location and contact C42 is closed when coated window C46 is interposed between window C27 and member C29. Accordingly, when these conditions persist, ultraviolet energy from source 22 is admitted through window C25 for passage through chamber C and window C27 onto material C48 which converts it to visible light and, in turn, projects it through window C46 and member C29 onto photocell element C36. The ultraviolet energy passing through chamber C is absorbed in relation to the concentration of halothane therein and thus affects the intensity of the visible light emanating from material C48. The visible light intensities from material C48 establish prescribed resistances for element C36. When air is circulating through chamber C during the balancing of measurement bridge MB of FIG. 3, as previously described, the resistance of element C36 enables capacitor C40 to assume the null voltage value. When halothane is circulating through chamber C, the resistance of element C36 is changed from the nulling value to alter the voltage across capacitor C40 and, in turn, unbalancing the bridge MB. Meter 28 of FIG. 3 monitors the unbalanced bridge condition whereby halothane is supplied or withheld from the closed loop system, as hereinbefore described.

FIG. 7 discloses an ultraviolet source 22 for projecting ultraviolet energy through an aperture D49 in a ring assembly D50 alternately onto the mirrors D51 and D52. Assembly D50 rotates around source 22 under control of positioning means D34. Ultraviolet energy from source 22 is reflected by mirror D51 onto the material D53 which converts it to visible light for passage through glass member D29 to impinge on photocell element D36. The latter then establishes a prescribed resistance for charging capacitor D39, as hereinbefore described, to provide a null voltage value in the measurement bridge MB of FIG. 3. Mirror D52 reflects the received ultraviolet energy through the sample cell 10 onto material D53 which converts it to visible light for passage through member D29 to impinge on element D36. As a result, element D36 produces a resistance for charging capacitor D40 to provide for the balancing of bridge MB when air is circulated through chamber D of cell 10, as already described, and for the unbalancing of bridge MB when halothane is present in chamber D. The unbalancing of bridge MB is monitored by meter 28 to supply and withhold halothane in the closed loop system, as hereinbefore explained.

The ring assembly D50 is rotated under control of the positioning means D43 which also controls the recurrent actuation of contacts D41 and D42 whereby ultraviolet energy from source 22 is projected through aperture D49 onto mirror D51 each time that contact D41 is closed and onto mirror D52 each time that contact D42 is closed. As already stated, the structure of sample cell 10 may be essentially similar to that disclosed in FIG. 6. Moreover, the conversion material D53 may, by way of example, comprise zinc silicate.

Halothane, known as 2-bromo-2-chloro-1:1:1-trifluoroethane, is suitable for use in accordance with our invention, is commercially available and may, by way of example, be of the brand marketed as Fluothane.

It is to be understood that the hereinbefore described arrangements are illustrative of the application of principles of our invention. In light of this teaching, it is apparent that numerous other arrangements may be devised by those skilled in the art without departing from the spirit and scope of the invention.

What is claimed is:
1. In combination,
means for supplying anesthesia,
apparatus for coupling the supplied anesthesia from said supplying means to a user for inhalation,
means for coupling exhaled anesthesia from said user to said supplying means,
and control means responsive to the receipt of anesthesia from said coupling apparatus for automatically controlling the application of prescribed volumes of anesthetic gas including said received anesthesia to said coupling means for coupling to said supplying means.

2. The combination in accordance with claim 1 wherein said control means comprises
means responsive to the receipt of an anesthesia sample from said inhale coupling apparatus for analyzing said received sample to determine the anesthetic gas concentration therein,
anesthetic gas vaporizer means,
and means controlled by said analyzing means for selectively circulating said anesthesia sample through said vaporizer means to apply a volume of anesthetic gas thereto for coupling to said supplying means via said exhale coupling means.

3. The combination in accordance with claim 2 wherein said analyzing means comprises
a sample cell having
an analyzing chamber,
inlet means for applying to said chamber an anesthesia sample received from said inhale coupling apparatus, and outlet means for coupling said anesthesia sample from said chamber to said circulating means;

a source for supplying ultraviolet energy;

and means operatively associated with said chamber and being responisve to the transmission of the supplied ultraviolet energy through said chamber and anesthesia sample determining the anesthetic gas concentratoin in the anesthesia sample in said chamber.

4. The combination in accordance with claim 3 wherein said sample cell further includes means defining an ultraviolet energy entrance to said chamber, and further comprising a filter means for absorbing ultraviolet energy at prescribed wavelengths, conversion means associated with said filter means and being responisve to ultraviolet energy from said source for converting the latter energy into energy of predetermined wavelengths, and positioning means for selectively positioning said conversion means between said ultraviolet source and said filter means whereby ultraviolet energy from said source is converted by said conversion means and is passed through said filter means and said entrance means into said chamber.

5. The combination in accordance with claim 4 wherein said sample cell further includes means defining a light exit from said chamber, further comprising another conversion means associated with said exit means for converting ultraviolet energy projected through said chamber and exit means into visible light, and wherein said determining means includes photosensor means responsive to the receipt of visible light from said other conversion means for indicating the anesthetic gas concentration in said chamber.

6. The combination in accordance with claim 5 wherein said photosensor means comprises a photocell element responsive to the receipt of visible light from said other conversion means for establishing discrete electrical resistances related to the anesthetic gas concentration in said chamber, and wherein said determining means further includes a pair of storage devices, and control means being responsive to the electrical resistances of said element for storing electrical conditions on each of said devices and comprising switching means controlled by said positioning means for connecting said element individually to one of said devices for storing a first electrical condition therein and to the other one of said devices for storing a second electrical condition therein.

7. The combination in accordance with claim 6 wherein said anesthetic gas comprises halothane gas having prescribed absorption charactreistics, which halothane, when present in said sample cell chamber, is responsive for passing visible light from said entrance means to said exit means and for absorbing ultraviolet energy from said source, and wherein said positioning means activates said switching means for alternately connecting said photocell element to said one device when said conversion means and filter means are positioned between said source and entrance means and to the other of said devices when said conversion means and filter means are removed from said position between said source and entrance means.

8. The combination in accordance with claim 7 wherein said source supplies ultraviolet energy having a peak intensity at a first prescribed wavelength, wherein said conversion means associated with said filter means is responsive to said ultraviolet energy at said first prescribed wavelength for converting it to ultraviolet energy at a second prescribed wavelength, and wherein said other conversion means is responsive to ultraviolet energies at both said first and second prescribed wavelengths for producing visible light corresponding to the intensities of said energies.

9. The combination in accordance with claim 8 wherein said source supplies ultraviolet energy having a peak intensity at 2537 Angstroms wavelength, wherein said conversion means associated with said filter means comprises a silicate composition and is responsive to the receipt of ultraviolet energy at 2537 Angstroms wavelength for converting it to ultraviolet energy at 3660 Angstroms wavelength, and wherein said filter means is responsive for passing ultraviolet energy at 3660 Angstroms wavelength and absorbing energies at other wavelengths.

10. The combination in accordance with claim 3 wherein said sample cell further comprises apparatus partitioning said chamber into two sections and comprising a plurality of apertures for passing an anesthesia sample between said sections, first conversion means associated with one of said chamber sections and being responsive to the receipt of ultraviolet energy from said source for converting the latter energy to visible light for transmission through said one chamber section, second conversion means associated with the other one of said chamber sections and being responsive to the transmission of ultraviolet energy from said source through said other chamber section for converting the transmitted energy to visible light, and wherein said determining means comprises translating apparatus including a unitary photocell body operative as a pair of elements each of which is associated with an individual one of said two chamber sections and is responsive to the receipt of the converted light under control of said associated chamber section for producing prescribed electrical resistances corresponding to the received light intensity, and means responsive to the resistances of said elements for indicating the anesthetic gas concentration in the anesthesia sample in said chamber sections.

11. The combination in accordance with claim 10 wherein said sample cell chamber comprises an aperture defining a light entrance to each of said chamber sections, another aperture defining a light exit from each of said chamber sections, a first window means affixed to said entrance aperture for sealing said chamber thereat and being operative for passing light energy, a second window means affixed to said exit aperture for sealing said chamber thereat and being operative for passing light energy, and wherein said first conversion means is aligned with said first window means over a segment of said entrance aperture associated with said one chamber section and said second conversion means is aligned with said second window means about a segment of said exit aperture associated with said other chamber section.

12. The combination in accordance with claim 3 wherein said determining means comprises conversion means responsive to the receipt of ultraviolet energy projected through said chamber for converting the latter energy to visible light, photosensor means responsive to the receipt of said visible light from said conversion means for supplying electrical resistances corresponding to the intensities of said visible light, a measurement bridge means including said photosensor means and means for supplying output potentials corresponding to the respective resistances of said photosensor means, and meter means responsive to said output potentials for generating indications of the anesthesia gas concentration in said chamber.

13. The combination in accordance with claim 12 further comprising means for selectively interrupting the circulation of an anesthesia sample through said sample cell chamber and circulating air through said chamber, wherein said measurement bridge further comprises electrical means operable for balancing said bridge, and wherein said meter means includes a device automatically responsive to a generated indication signifying that the anesthetic gas concentration in said chamber is above zero during the circulation of air therethrough for operating said electrical balancing means to balance said bridge.

14. The combination in accordance with claim 12 wherein said circulating means comprises switching valve means which is controllable for bypassing said anesthetic gas vaporizer to exclude the circulation of said anesthesia sample therethrough, and wherein said meter means includes apparatus automatically responsive to a generated indication signifying that the anesthetic gas concentration in said anesthesia sample is at a prescribed value for controlling said valve means whereby it bypasses said vaporizer and circulates said anesthesia sample in said chamber to said exhale coupling means without applying anesthetic gas thereto from said vaporizer.

15. The combination in accordance with claim 14 further comprising means for selectively circulating air through said sample cell chamber including a first valve means saving an air intake device, an intake means for receiving an anesthesia sample from said inhale coupling apparatus, a valve outlet means coupled to said inlet means of said sample cell, and means providing a circulation path between said valve outlet means and said anesthesia sample intake means and being operable for interrupting said provided path and for establishing a circulating path between said valve outlet means and said air intake device;

and a second valve means having an air exhaust device, an exhaust means for an anesthesia sample and being coupled to said switching valve means, a valve inlet means for air and anesthesia samples from said sample cell outlet means, and means providing a circulation path between said valve inlet means and said sample exhaust means and being operable for establishing a circulation path between said valve inlet means and said air exhaust device;

and control apparatus selectively activated for operating said establishing means of said first and second valve means for effecting the circulation of air through said sample cell chamber.

16. The combination in accordance with claim 15 wherein said control apparatus comprises a device for sensing the ultraviolet energy supplied by said source, a switching arrangement activated by said sensing device for operating said establishing means of said first and second valve means for effecting the circulation of air through said sample cell chamber when a prescribed intensity of the ultraviolet energy is sensed by said sensing device.

17. The combination in accordance with claim 16 wherein said sensing device comprises a photocell for detecting visible light and generating electrical resistances corresponding to the intensities of the detected light, a conversion means associated with said detecting photocell for converting supplied ultraviolet energy from said source to visible light for application to the latter photocell, and means responsive to the generated electrical resistances of said detecting photocell for controlling the activation of said switching arrangement.

18. The combination in accordance wtih claim 17 wherein said switching arrangement comprises an electromechanical switching circuit being selectively activated for operating said establishing means of said first and second valve means for effecting the circulation of air through said sample cell chamber, and wherein said switching arrangement control means comprises a transistor amplifier responsive to a predetermined electrical resistance generated by said detecting photocell for activating said electromechanical switching circuit.

19. The combination in accordance with claim 18 wherein said electromechanical switching circuit comprises a first relay actuatable for operating said establishing means of said first and second valve means, and a second relay activated by said transistor amplifier for actuating said first relay.

20. The combination in accordance with claim 19 further comprising a first timing means responsive to the activation of said second relay for deactuating said first relay at a timed interval after the activation of said second relay:

and a second timing means thereafter activated under control of said second relay for actuating said first relay at recurring time intervals whereby said establishing means of said first and second valve means is operated at recurring time intervals for circulating air through said sample cell chamber.

21. The combination in accordance with claim 20 wherein said measurement bridge comprises resistance means adjustable for balancing said bridge, and servo motor means operable for adjusting said resistance means, and said meter means includes a device cooperating with said first relay and being automatically responsive to a generated indication of said meter means signifying that the anesthetic gas concentration in said chamber is above zero during the circulation of air therethrough for operating said motor means whereby said resistance means is adjusted to balance said bridge.

22. Analyzer-controller equipment comprising a first loop means for conveying a gas;

a sample cell having a chamber, inlet means for applying to said chamber a gas sample received from said loop means, and outlet means for coupling said gas sample from said chamber;

a source for supplying ultraviolet energy, means operatively associated with said chamber and being responsive to the transmission of the supplied ultraviolet energy through said chamber and gas sample for determining the concentration of the gas sample in said chamber, gas vaporizer means, a second loop means for conveying gas, and means controlled by said determining means for selectively circulating said gas sample through said vaporizer means to apply a volume of said gas to said second loop means.

23. Analyzer-controller equipment in accordance with claim 22
wherein said sample cell further includes
means defining an ultraviolet and visible light entrance to said chamber
and means defining an ultraviolet and visible light exit from said chamber,
and wherein said determining means includes
a first conversion means positionable between said source and said entrance means for converting ultraviolet energy from said source into visible light,
a second conversion means for converting ultraviolet energy to visible light,
means responsive to the selective receipt of visible light from said exit and from said second conversion means for translating said light into indications of the gas sample concentration in said chamber,
and means operative for alternately positioning said first conversion means between said source and said entrance means and said second conversion means between said exit means and said translating means whereby visible light is conveyed through said chamber and said exit means to said translating means and alternately ultraviolet energy is conveyed through said entrance means, said chamber and said exit means to said second conversion means for conversion into visible light and transmission to said translating means.

24. Analyzer-controller equipment in accordance with claim 23 wherein said first and second conversion means each comprise quartz window means having a surface and being effective to pass ultraviolet and visible light, and a zinc silicate material coated on said surface.

25. Analyzer-controller equipment in accordance with claim 23 wherein said translating means comprises
a sensing device responsive to the receipt of visible lights for establishing electrical resistances,
a pair of capacitors,
and means including said sensing device and switch contact means selectively actuated by said positioning means for charging one of said pair of capacitors when said first conversion means is positioned between said source and entrance means and for charging the other one of said capacitors when said second conversion means is positioned between said exit means and said translating means.

26. Analyzer-controller equipment in accordance with claim 25 wherein said determining means further includes
a measurement bridge comprising said pair of capacitors, a voltage source, a first resistance serially connected with one of said pair of capacitors and said voltage source, a second resistance serially connected with another one of said pair of capacitors and said voltage source, a bias resistance connected to said voltage source, and a pair of oppositely-poled diodes connected in parallel with said pair of capacitors and to said bias resistance;
and meter means connected in parallel with said pair of capacitors and being responsive to the electrical charges of said capacitors for supplying indications of the gas sample concentrations in said chamber.

27. In a closed loop system for administering anesthesia to a patient
means for receiving a sample of the anesthesia inhaled by said patient,
means responsive to the receipt of said anesthesia sample for analyzing the anesthetic gas concentration thereof,
and means activated by said analyzing means for selectively supplying anesthetic gas including said sample of anesthesia to said closed loop system for regulating the anesthesia supplied to said patient.

28. The invention as set forth in claim 27 wherein said analyzing means includes
an ultraviolet energy source;
a pair of mirrors;
means for alternately projecting ultraviolet energy from said source onto each of said mirrors;
a sample cell having a chamber, inlet means for admitting said anesthesia sample to said chamber, outlet means for conveying said anesthesia sample from said chamber, and means associated with said chamber and being responsive to ultraviolet energy reflected from a first one of said pair of mirrors for transmitting said reflected energy through said chamber and said anesthesia sample therein,
conversion means selectively responsive to the receipt of ultraviolet energy reflected from the other one of said pair of mirrors and ultraviolet energy transmitted through said chamber and said anesthesia sample therein for converting said received ultraviolet energies into prescribed visible light intensities,
and means including a photocell responsive to the receipt of visible light intensities from said conversion means for generating indications of the anesthetic gas in said chamber.

29. The invention as set forth in claim 28 wherein said anesthetic gas supplying means comprises an anesthetic gas vaporizer means, means for pumping said anesthesia sample from said chamber via said outlet means through said vaporized means for supplying anesthetic gas to the closed loop system, and valve means selectively actuated by said indication generating means for blocking the pumping of said anesthesia sample through said vaporizer means and thereby to withhold the supply of anesthetic gas to the closed loop system.

References Cited
UNITED STATES PATENTS

| | | | |
|---|---|---|---|
| 2,407,838 | 9/1946 | Kliever | 73—23 X |
| 2,721,578 | 10/1955 | Pouppirt | 73—23 X |
| 2,883,270 | 4/1959 | Johnson | 23—254 |
| 2,915,056 | 12/1959 | Lee | 128—194 |
| 3,114,610 | 12/1963 | Gafford et al. | 23—255 |
| 3,166,676 | 1/1965 | Robinson | 128—191 X |
| 3,239,311 | 3/1966 | Luehrmann et al. | 73—23.1 X |

WILLIAM E. KAMM, Primary Examiner

U.S. Cl. X.R.

23—255; 73—23; 137—93; 250—43.5